United States Patent
Lee et al.

(10) Patent No.: US 10,603,868 B2
(45) Date of Patent: Mar. 31, 2020

(54) MELT-BLOWN FIBER WEB HAVING IMPROVED ELASTICITY AND COHESION, AND MANUFACTURING METHOD THEREFOR

(71) Applicants: IKSUNG Co., LTD., Chungcheongbuk-do (KR); Hun Joo Lee, Gyeonggi-do (KR); Kee Wook Yang, Chungcheongbuk-do (KR)

(72) Inventors: Hun Joo Lee, Gyeonggi-do (KR); Kee Wook Yang, Chungcheongbuk-do (KR); Jong Hyuk Cha, Chungcheongbuk-do (KR); Gue Ssuk Kang, Chungcheongbuk-do (KR); Chang Hyeon Kim, Chungcheongbuk-do (KR)

(73) Assignee: IKSUNG CO., LTD., Chungcheongbuk-do (KR)

( * ) Notice: Subject to any disclaimer, the term of this patent is extended or adjusted under 35 U.S.C. 154(b) by 0 days.

(21) Appl. No.: 16/198,976

(22) Filed: Nov. 23, 2018

(65) Prior Publication Data

US 2019/0091967 A1 Mar. 28, 2019

Related U.S. Application Data

(62) Division of application No. 14/441,965, filed as application No. PCT/KR2013/009353 on Oct. 18, 2013, now abandoned.

(30) Foreign Application Priority Data

Jul. 18, 2013 (KR) .................. 10-2013-0084974

(51) Int. Cl.
*D01D 5/08* (2006.01)
*D01D 7/00* (2006.01)
(Continued)

(52) U.S. Cl.
CPC ............... *B32B 5/022* (2013.01); *B32B 3/30* (2013.01); *B32B 5/12* (2013.01); *B32B 5/26* (2013.01);
(Continued)

(58) Field of Classification Search
CPC .... B32B 3/30; B32B 5/12; B32B 5/26; B32B 37/20; B32B 2250/02; B32B 2307/102;
(Continued)

(56) References Cited

U.S. PATENT DOCUMENTS 5,641,555 A 6/1997 Berrigan
6,867,156 B1 3/2005 White
(Continued)

FOREIGN PATENT DOCUMENTS

CA 2166612 2/1995
EP 2918718 9/2015
(Continued)

OTHER PUBLICATIONS

ASM International. Engineered Materials Handbook. Section on Thermoplastics. Copyright 2012.
(Continued)

*Primary Examiner* — Leo B Tentoni
(74) *Attorney, Agent, or Firm* — Nixon & Vanderhye P.C.

(57) ABSTRACT

The present invention relates to a melt-blown fiber web having improved elasticity and cohesion, and a manufacturing method therefor. The objective of the present invention is accomplished by a melt-blown fiber web comprising a thermoplastic resin which comprises 10 to 60 wt % of thermoplastic resin microfibers and 40 to 90 wt % of non-circular cross-sectional hollow conjugated staple fibers with respect to the total weight of the fiber web.

3 Claims, 9 Drawing Sheets

(51) Int. Cl.
*D04H 5/06* (2006.01)
*B32B 5/02* (2006.01)
*D04H 1/4391* (2012.01)
*D04H 1/541* (2012.01)
*D04H 1/56* (2006.01)
*D04H 3/018* (2012.01)
*D04H 3/16* (2006.01)
*D01D 5/098* (2006.01)
*B32B 3/30* (2006.01)
*B32B 5/12* (2006.01)
*B32B 5/26* (2006.01)
*D04H 1/4291* (2012.01)
*D04H 1/74* (2006.01)

(52) U.S. Cl.
CPC .......... *D01D 5/0985* (2013.01); *D04H 1/4291* (2013.01); *D04H 1/4391* (2013.01); *D04H 1/541* (2013.01); *D04H 1/56* (2013.01); *D04H 1/74* (2013.01); *D04H 3/018* (2013.01); *D04H 3/16* (2013.01); *B32B 2262/0253* (2013.01); *B32B 2307/102* (2013.01); *B32B 2307/51* (2013.01); *B32B 2605/00* (2013.01); *D10B 2321/02* (2013.01); *D10B 2321/022* (2013.01); *D10B 2403/0114* (2013.01); *D10B 2505/12* (2013.01)

(58) Field of Classification Search
CPC .......... D01D 5/08; D01D 5/0985; D01D 7/00; D04H 1/54; D04H 1/541; D04H 1/56; D04H 1/74; D04H 5/06
USPC ........ 264/103, 171.1, 211.12, 510, 517, 518, 264/555; 156/167, 180, 181
See application file for complete search history.

(56) References Cited

U.S. PATENT DOCUMENTS

| | | | |
|---|---|---|---|
| 2007/0042665 | A1 | 2/2007 | Peng et al. |
| 2010/0159775 | A1 | 6/2010 | Chambers, Jr. |
| 2011/0139543 | A1* | 6/2011 | Coates ............... D04H 1/54 |
| | | | 181/290 |
| 2013/0030340 | A1* | 1/2013 | Vincent ............... D04H 1/541 |
| | | | 602/42 |

FOREIGN PATENT DOCUMENTS

| | | |
|---|---|---|
| KR | 10-1999-028289 | 4/1999 |
| KR | 10-0903559 | 6/2009 |
| KR | 10-2013-0048569 | 5/2013 |
| WO | WO95/05232 | 2/1995 |

OTHER PUBLICATIONS

Ban Wu Yong, Chinese Master's Theses Full-text Database, 2013 7th version, Engineering Science and Technology I, "Research for sound absorption performance of the melt-blown nonwoven material" Published date : Jul. 15, 2013 (pp. 21-23).
International Search Report for PCT/KR2013/009353, dated Apr. 30, 2014, 4 pages.
Machine Translation of KR 10-0903559 Beom et al. Obtained from KIPO on Dec. 28, 2016.
Office Action dated Jan. 3, 2017 received in Chinese Application No. 201380003583.7 (Applicant: Ksung Co Ltd, Lee Hun Joo, Yang Kee Wook; Title: Melt-blown fiber web having improved elasticity and cohesion, and manufacturing method therefor) with English machine translation.
Supplementary European Search Report dated Jan. 20, 2017 received in Application No. EP13889454 (Applicants: Iksung Co Ltd, Lee Hun Joo, Yang Kee Wook; Title: Melt-Blown Fiber Web Having Improved Elasticity and Cohesion, and Manufacturing Method Therefor).
Written Translation of KR 10-0903559 Gwak et al.

* cited by examiner

MELT-BLOWN FIBER WEB HAVING IMPROVED ELASTICITY AND COHESION, AND MANUFACTURING METHOD THEREFOR

This application is a divisional of U.S. application Ser. No. 14/441,965, filed on May 11, 2015, which is the U.S. National Phase of International Application No. PCT/KR2013/009353, filed Oct. 18, 2013, which claims the benefit of priority to Korean Application No. 10-2013-0084974, filed Jul. 18, 2013, each incorporated by reference in its entirety.

TECHNICAL FIELD

The present invention relates to a melt-blown fiber web having improved elasticity and cohesive strength, and a manufacturing method thereof.

BACKGROUND ART

Indoor noise in internal combustion engine vehicles, ships and aircrafts has been issued. To prevent indoor noise, various sound absorption materials have been produced and marketed.

Melt-blown fiber webs have excellent sound absorption performance and light unit weight, and thus have been used as sound absorption materials. Such fiber webs can be produced from thermoplastic resin by melt-blown technology.

Korean Patent Application No. 10-2010-7000497 discloses a porous nonwoven web comprising staple fibers intermingled with melt-blown fibers, wherein the melt-blown fibers comprise a bimodal mixture of intermingled microfibers and mesofibers, and wherein there are at least about five times as many microfibers as mesofibers and wherein the mesofibers comprise at least about 30% by weight of the melt-blown fibers.

In addition, Korean Patent No. 0903559 discloses a sound-absorbing nonwoven fabric, which comprises a specific amount of hollow conjugated staple fibers uniformly dispersed in a melt-blown nonwoven fabric made of bicomponent microfibers and has a large surface area per unit weight and good sound absorption performance.

DISCLOSURE

Technical Problem

It is an object of the present invention to provide a melt-blown fiber web which has excellent sound absorption properties and a large specific surface area, and is light in weight per unit volume so as to be able to increase the energy efficiency of vehicles, and a production method thereof.

Another object of the present invention is to provide a melt-blown fiber web which has excellent elasticity and cohesive strength and also has excellent heat insulation properties and noise reduction performance due to a significantly large number of air layers formed between microfibers, and which can lead to an increase in energy efficiency, and a production method thereof.

Technical Solution

In order to accomplish the above objects, the present invention provides a melt-blown fiber web consisting of thermoplastic resin, the fiber web comprising 10-60 wt % of thermoplastic resin microfibers and 40-90 wt % of non-circular cross-sectional hollow conjugated staple fibers with respect to the total weight of the fiber web.

Preferably, the non-circular cross-sectional hollow conjugated staple fibers have a single fiber fineness of 1-50 denier and a hollow ratio of 10% or higher. Preferably, the non-circular cross-sectional hollow conjugated staple fibers are polygonal or tubular in cross section or have a protrusion/depression pattern at the outer circumferential portion thereof, and have an enlarged specific surface area.

Preferably, the melt-blown fiber web comprises a horizontal fiber layer and a vertical fiber layer formed on the horizontal fiber layer; the horizontal fiber layer and the vertical fiber layer are continuously stacked and connected; and the vertical fiber layer is composed of peaks and valleys, which have a height of 2-50 mm depending on the stacked thickness and are arranged at irregular intervals. Thus, the melt-blown fiber web has excellent elasticity and a high recovery rate.

Preferably, fibers at the top of the vertical fiber layer are entangled with one another to form the uppermost portion of the waved fiber web.

In addition, the melt-blown fiber web further comprises a covering fabric composed of a spunbond nonwoven fabric on the upper and lower surfaces thereof.

In another aspect, the present invention provides a method for producing a melt-blown fiber web, the method comprising the steps of: extruding a thermoplastic resin composition through an extruder; spinning the extruded thermoplastic resin composition with a high-temperature and high-pressure gas to form thermoplastic resin microfibers; air-blending the thermoplastic resin microfibers with non-circular cross-sectional hollow conjugated staple fibers to form filaments; producing a melt-blown fiber web by forming one portion of the filaments into a horizontal fiber layer and consecutively forming a vertical fiber layer on the horizontal fiber layer by bringing the other portion of the filaments into contact with a stack pattern change unit; and winding the produced melt-blown fiber web.

Advantageous Effects

According to the present invention, the melt-blown fiber web having improved elasticity and cohesive strength can be produced by air-blending melt-blown fiber web having specific skeleton with non-circular cross-sectional hollow conjugated staple fibers having high elasticity and a high hollow ratio.

Further, the melt-blown fiber web according to the present invention can be produced by a simpler process, has a low density, is more bulky, is light in weight, and has a high compression recovery rate and cohesive strength, compared to conventional sound absorption materials (PU foam, PET felt, glass fiber, etc.).

In addition, the melt-blown fiber web according to the present invention may be used as a sound absorption material or a thermal insulation material.

MODE FOR INVENTION

As used herein, the term "thermoplastic resin" refers to a resin that can be repeatedly melted at a temperature higher than the melting point of the polymer resin and solidified by cooling. The thermoplastic resins can be divided, according to the degree of crystallization, crystalline thermoplastic resins and amorphous thermoplastic resins. The crystalline thermoplastic resins include polyethylene, polypropylene, nylon and the like, and the amorphous thermoplastic resins include polyvinyl chloride, polystyrene and the like.

As used herein, the term "polypropylene" is intended to encompass not only homopolymers of propylene, but also copolymers wherein at least 40% of the recurring units are propylene units.

As used herein, the term "polyolefin" is intended to mean any of a series of largely saturated open-chain polymeric hydrocarbons composed only of carbon and hydrogen atoms. Typical polyolefins include polyethylene, polypropylene, polymethylpentene, and various combinations of ethylene, propylene and methylpentene monomers.

The term "polyester" as used herein is intended to embrace polymers wherein at least 85% of the recurring units are condensation products of dicarboxylic acids and dihydroxy alcohols with polymer linkages created by formation of ester units. This includes aromatic, aliphatic, saturated, and unsaturated di-acids and di-alcohols. The term "polyester" as used herein also includes copolymers, blends, and modifications thereof. A common example of a polyester is poly(ethylene terephthalate) (PET) which is a condensation product of ethylene glycol and terephthalic acid.

As used herein, the term "melt-blown microfibers" means the fibers or filaments formed by extruding a molten melt-processible polymer together with a high-temperature and high-velocity compressed gas through a plurality of fine capillaries. Herein, the capillaries may have various shapes, including polygonal shapes such as circular, triangular and square shapes, and a star shape. For example, the high-temperature and high-velocity compressed gas can attenuate the filaments of molten thermoplastic polymer material to reduce their diameter to about 0.3-10 µm. The melt-blown microfibers may be discontinuous fibers or continuous fibers. 70 to 80% or 90% of the melt-blown microfibers may have a diameter of 10 µm or less. Further, 10%, 20% or 30% of the melt-blown microfibers may have a diameter of 3 µm or less.

As used herein, the term "spunbond nonwoven fabric" means a fiber web produced by extruding a molten polymer material through a plurality of fine capillaries to form filaments, drawing the filaments through high-temperature tubes and stacking the drawn filaments.

Figure 7:
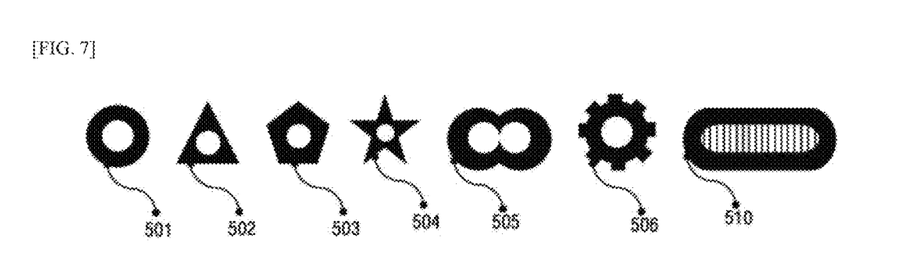
FIG. 7 shows the various cross-sections of non-circular cross-sectional hollow conjugated staple fibers that are used in the present invention.
Figure 8:
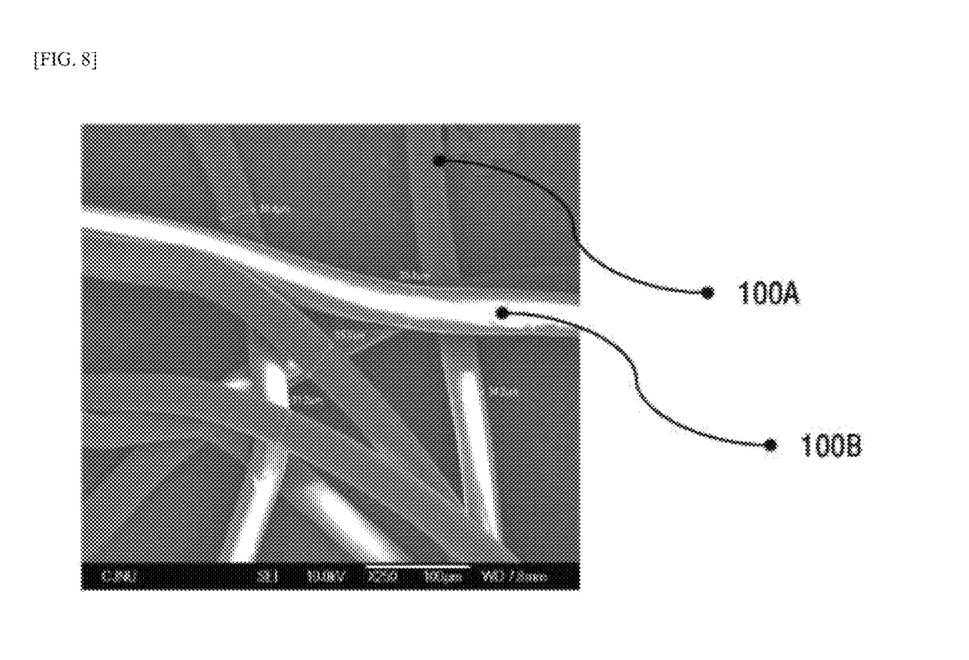
FIG. 8 is an optical micrograph of non-circular cross-sectional hollow conjugated staple fibers that are used in the present invention.
Figure 9:
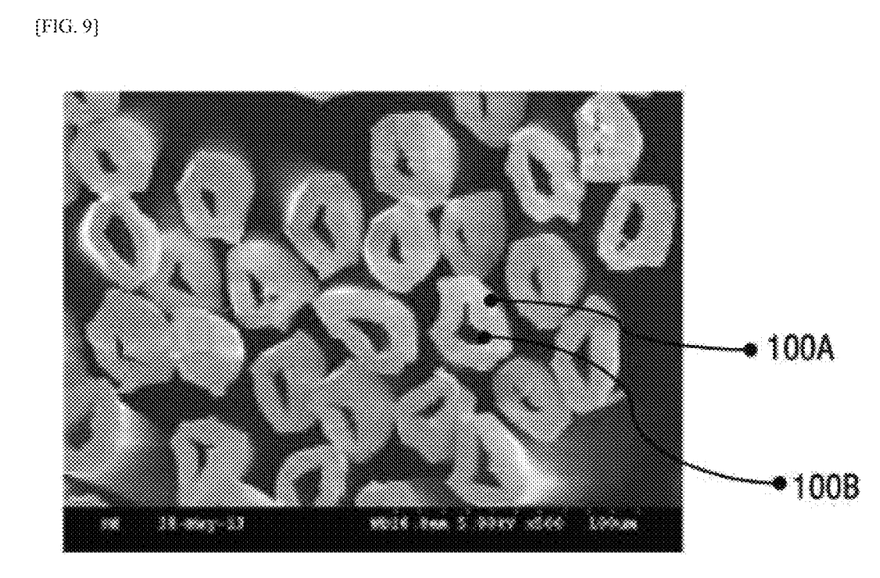
FIG. 9 is an electron micrograph of the cross-section of non-circular cross-sectional hollow conjugated staple fibers that are used in the present invention.

As used herein, the term "non-circular cross-sectional hollow conjugated staple fibers" means fibers produced by extruding a bicomponent polyolefin material through a plurality of fine capillaries to form filaments and drawing the filaments through high-temperature tubes to form hollow portions. FIG. 7 shows the various cross-sections of the capillaries. The shape of the capillaries may be any one of polygonal shapes, including a circular shape 501, a triangular shape 502 and a pentagonal shape 503. Alternatively, it may also be non-circular cross-sectional cross-sections which have various shapes, such as a star shape 504 or a dumbbell shape 505. Alternatively, the capillaries may also have a tubular shape 510 or may have a protrusion/depression pattern 506 at the outer circumferential portion thereof. Non-circular cross-sectional hollow conjugated staple fibers formed by using capillaries having a tubular shape 510 or a protrusion/depression pattern 506 have an enlarged specific surface area.

The bicomponent materials of polyolefin series may be composed of two selected from the group consisting of polypropylene, polyethylene, polymethylpentene, nylon, polylactic acid (PLA), and polytrimethylterephthalate (PTT).

The non-circular cross-sectional hollow conjugated staple fibers preferably have a single fiber fineness of 1-50 denier, more preferably 4-8 denier. Further, the non-circular cross-sectional hollow conjugated staple fibers preferably have an average length of 30-60 mm. The crimp of the non-circular cross-sectional hollow conjugated staple fibers is not artificial, but shows a random curl shape by the intermolecular force between the two components of the bicomponent material. Further, the non-circular cross-sectional hollow conjugated staple fibers can be restored to their original shape by lightly heating them, and the surface thereof may also be treated with silk. The non-circular cross-sectional hollow conjugated staple fibers that are used in the present invention preferably have a hollow ratio of 10% or higher. Because the non-circular cross-sectional hollow conjugated staple fibers that are used in the present invention have a non-circular shaped cross-section and a hollow ratio of 10% or higher, these staple fibers can exhibit high elasticity and a high hollow ratio.

As used herein, the term "nonwoven fabric", "fiber web" or "nonwoven fabric web" means a structure composed of individual fibers, microfibers or yarns which are arranged without a pattern and in an irregular pattern in contradistinction to knitted fabric to form a planar material.

Hereinafter, the present invention will be described in detail with reference to the accompanying drawings so that it can be easily carried out by those skilled in the art.

Figure 1:
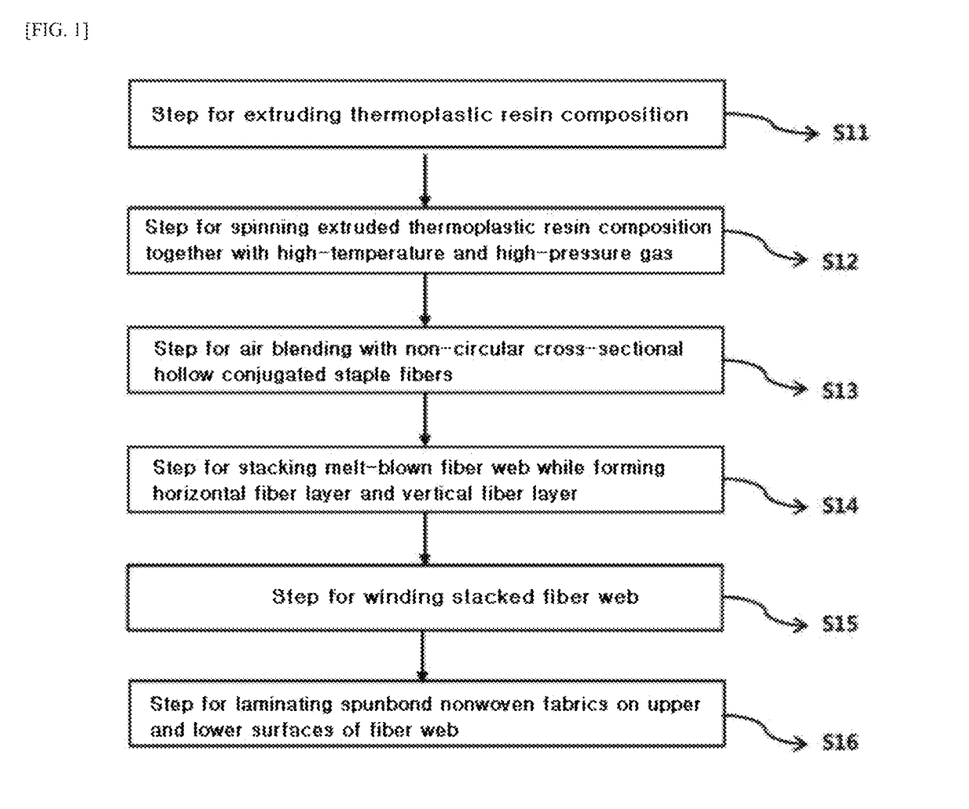
FIG. 1 is a flow chart showing a method for producing a melt-blown fiber web according to an embodiment of the present invention.

FIG. 1 shows each step of a method for producing a melt-blown fiber web according to the present invention. Specifically, the production method according to the present invention comprises the steps of: (S11) extruding a thermoplastic resin composition through an extruder; (S12) spinning the extruded thermoplastic resin composition together with a high-temperature and high-pressure gas to form microfibers; (S13) air-blending the thermoplastic resin microfibers with non-circular hollow conjugated staple fibers to form filaments; (S14) stacking one portion of the filaments in a horizontal orientation and in a predetermined pattern to form a horizontal fiber layer, and stacking a vertical fiber layer, bringing the other portion of the filaments into contact with a stack pattern change unit, to produce a melt-blown fiber web; and (S16) laminating a spunbond nonwoven fabric on the upper and lower surfaces of the fiber web.

Figure 2:
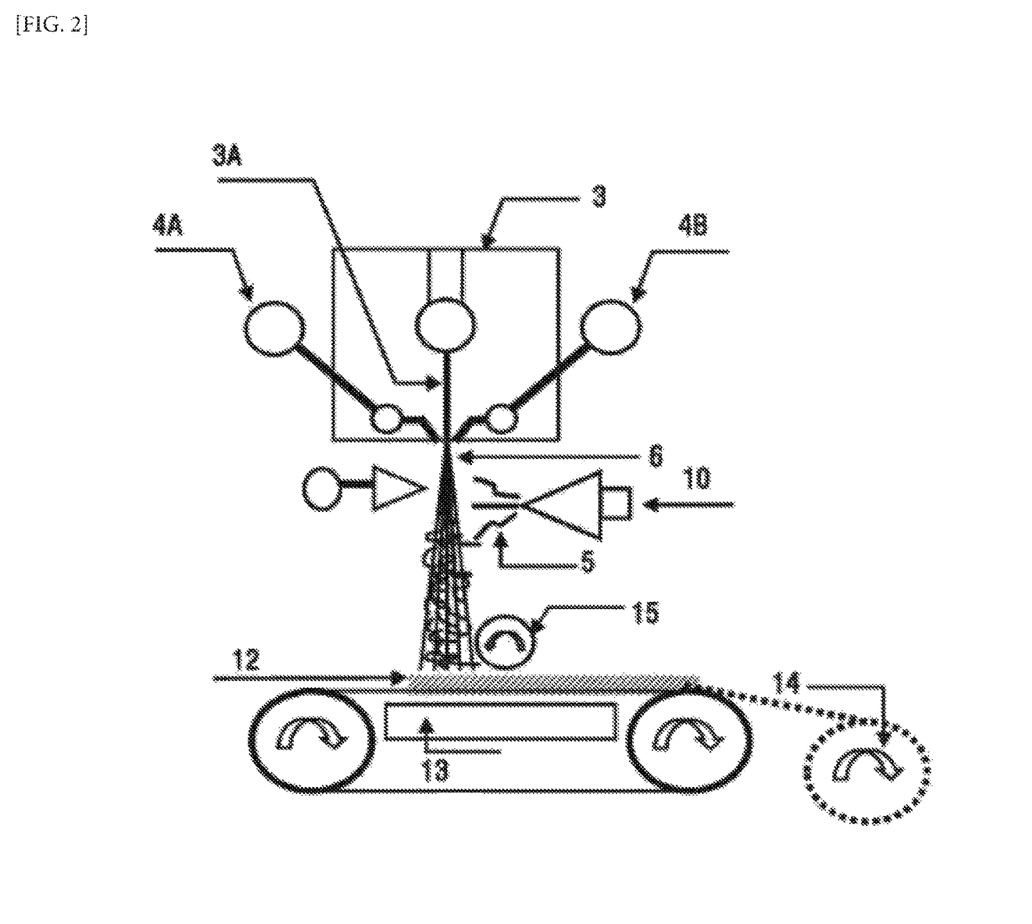
FIG. 2 is a schematic view showing an apparatus for producing a melt-blown fiber web according to an embodiment of the present invention.

FIG. 2 schematically shows a fiber web production apparatus that can perform the above production steps.

First, a thermoplastic resin and additives are introduced into an extruder in which they are then kneaded, heated and extruded. The extruded material is transferred to a spinning die 3, and spun through 30-50 orifices in the direction of a collector 13 to form fibers. During spinning, a high-temperature and high-velocity gas, injected from high-temperature and high-velocity gas injection holes 4A and 4B disposed in the spinning die 3, may be allowed to collide with the fibers, thereby forming melt-blown microfibers 6.

At the same time, non-circular hollow conjugated fibers may be supplied to the portion of spinning the melt-blown microfibers through a fiber supply unit 10 disposed below the spinning die 3, and may be air-blended with the melt-blown microfibers.

Herein, the blending may be performed so that the melt-blown fiber web will comprise 10-60 wt % of the thermoplastic resin microfibers and 40-90 wt % of the non-circular non-circular hollow conjugated staple fibers. If the content of the non-circular cross-sectional hollow conjugated staple fibers in the melt-blown fiber web is lower than 40 wt %, the compression recovery rate will be reduced as described in Comparative Example 3 (staple fiber content: 25 wt %). If the content of the non-circular cross-sectional hollow conjugated staple fibers in the melt-blown fiber web is higher than 90 wt %, the minimum framework of the melt-blown fiber web will not be formed, and the microfibers will not be blended with the non-circular cross-sectional hollow conjugated staple fibers, and thus the cohesive strength of the fiber web will decrease.

50 wt % of the blend of the non-circular cross-sectional hollow conjugated staple fibers and the melt-blown microfibers may directly reach the collector 13 without passing through a stack pattern change unit 15, and may be stacked on the collector 13 in a horizontal orientation to form a horizontal layer 10. The remaining 50 wt % of the fibers may pass through the stack pattern change unit 15 to change the orientation thereof to a vertical orientation, and may be stacked on the horizontal layer 10 in a vertical orientation to form a vertical fiber layer 20. Herein, the horizontal fiber layer 10 and the vertical fiber layer 20 may also be formed on the same layer, and the vertical fiber layer is continuously stacked on the horizontal fiber layer to form an entangled structure. The vertical fiber layer may be composed of peaks and valleys, which have a height of 2-50 mm and are arranged at irregular intervals.

Figure 5:
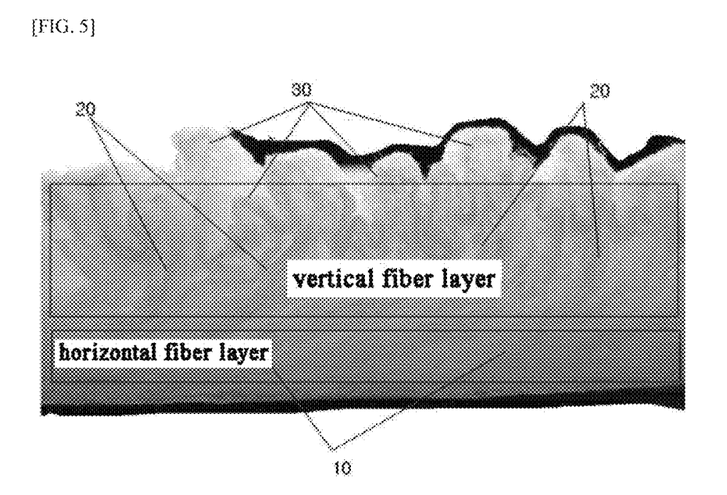
FIG. 5 is a cross-sectional view of a waved melt-blown fiber web according to an embodiment of the present invention.

FIG. 5 shows a cross-sectional view of the melt-blown fiber web comprising the horizontal fiber layer 10 and the vertical fiber layer 20. The fibers at the top of the vertical fiber layer 20 may be entangled with one another to form a waved layer 30 that forms the uppermost portion of the fiber web. The waved layer 30 may be configured such that the lines defined by the peaks and valleys of the wave are arranged at irregular intervals in a horizontal direction.

Figure 3:
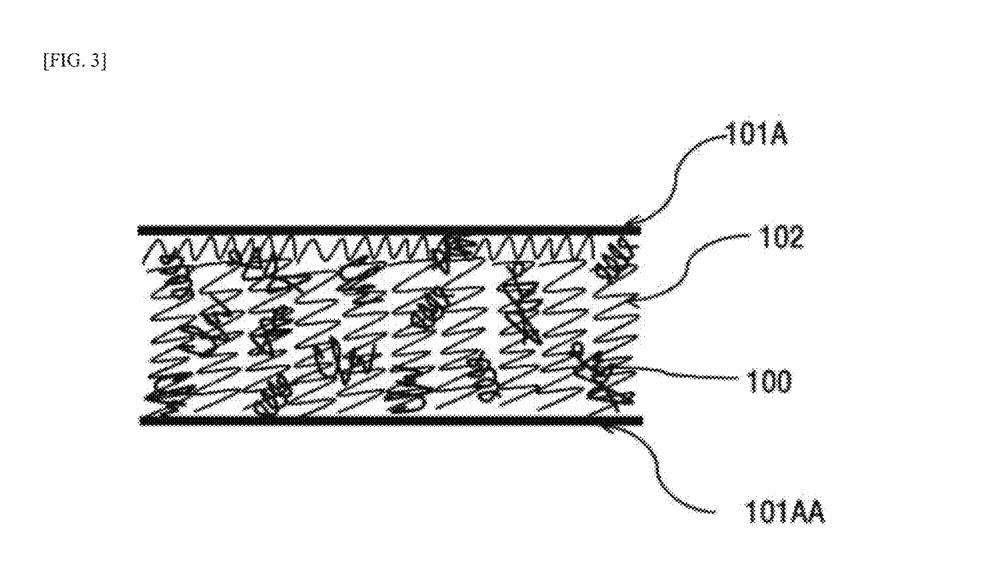
FIG. 3 is a schematic cross-sectional view of a melt-blown fiber web according to an embodiment of the present invention.
Figure 4:
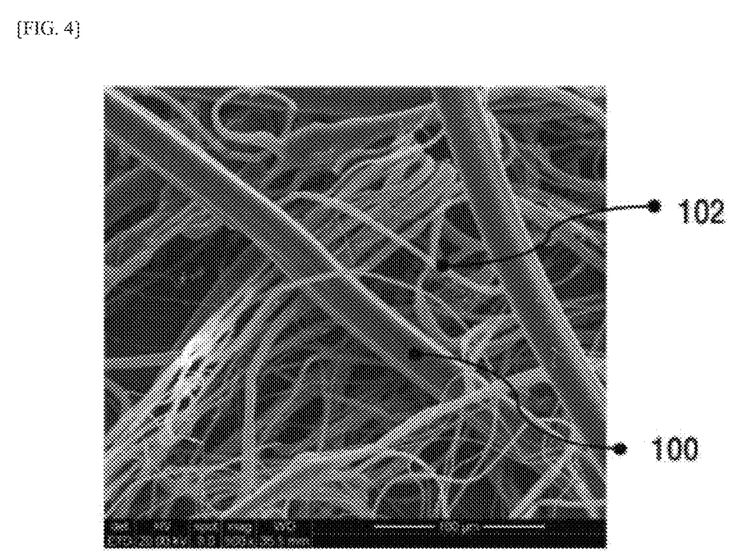
FIG. 4 is an electron micrograph of a melt-blown fiber web according to an embodiment of the present invention.

FIG. 3 schematically shows the structure of a melt-blown fiber web according to an embodiment of the present invention, and FIG. 4 is a scanning electron micrograph of the cross-section of the melt-blown fiber web. As can be seen in FIGS. 3 and 4, spunbond nonwoven fabrics 101A and 101AA are laminated on the upper and lower surfaces of the melt-blown fiber web, and the melt-blown microfibers 102 and the conjugated staple fibers 100 are blended with one another in the fiber web.

The stack pattern change unit 15 is composed of a steel roll having a length of 2,200 mm and a diameter of 100 pi, a steel roll having the same size as that of the above steel roll, and a stainless steel mesh belt connected to the rolls and having a diameter of 2,100 mm. The distance between the steel rolls is 400 mm, and the two steel rolls are rotated in the same direction at the same speed. In addition, inside of the mesh belt may include an absorption unit configured to absorb the high-temperature and high-pressure gas injected from the spinning die 3. The vertical distance between the stack pattern change unit 15 and the spinning die 3 is preferably 40% longer than the distance between the stack pattern change unit 15 and the collector 13. At this distance, 50 wt % of the melt-blown microfibers, spun from the spinning die and air-blended with the non-circular cross-sectional hollow conjugated staple fibers, can be collected.

Hereinafter, the present invention will be described in detail with reference to examples, but the scope of the present invention is not limited to these examples.

Example 1

A thermoplastic resin composition comprising 99.8 wt % of homopropylene H7914 polymer resin (LG Chemical Ltd.) having a melt index of 1400 g/10 min (230° C.), 0.01 wt % of UV stabilizer Tinuvin 622 (Ciba Special Chemical) and 0.01 wt % of thermal stabilizer Irganox 1010 was fed into an extruder. The single extruder having an L/D ratio of 1/28 was rotated at 80 rpm to knead, heat and extrude the thermoplastic resin composition. Then, the kneaded composition was transferred to the spinning die 3, and spun in the direction of the collector 13 through 32 orifices (orifice diameter: 0.2 mm) per inch to form spun fibers. During spinning, a high-temperature and high-velocity gas, injected from a high-temperature and high-velocity gas injection holes 4A and 4B formed in the spinning die 3, was allowed to collide with the fibers, thereby producing melt-blown microfibers 6 made of polypropylene and having an average thickness of 3 μm.

At the same time, polyolefin-based non-circular cross-sectional hollow conjugated staple fibers 5 (Huvis Co., Ltd.; X94, X01 or N368), having an average thickness of 6 denier and an average length of 40 mm and comprising a silk-treated surface, were supplied through the conjugated fiber supply unit 10 to the portion to which the melt-blown microfibers were spun and in which the melt-blown microfibers 6 were air-blended with the non-circular cross-sectional hollow conjugated staple fibers 5.

Herein, the melt-blown microfibers and the non-circular cross-sectional hollow conjugated staple fibers were blended at a weight ratio of 50:50.

50 wt % of the melt-blown fibers 11 were allowed to directly reach the collector 13 without passing through the stack pattern change unit 15, and were stacked on the collector 13 in a horizontal orientation. The remaining 50 wt % of the melt-blown fibers 11 were passed through the stack pattern change unit 15 to change the orientation of the fibers 11 to a vertical orientation, and were stacked on the horizontally oriented melt-blown fiber web in a vertical orientation.

The melt-blown fiber web 12 produced as described above had a weight of 300 g/m², and was wound in a winding machine 14 to have a width of 1,800 mm and a length of 50 m.

Spunbond nonwoven fabrics 101A and 101AA were laminated on both surfaces of the wound fiber web, thereby producing a melt-blown fiber web having a total weight of 330 g/m² and a thickness of 35 mm.

Example 2

A melt-blown fiber web was produced in the same manner as described in Example 1, except that melt-blown microfibers and non-circular cross-sectional hollow conjugated staple fibers were used at a weight ratio of 40:60 and that the melt-blown fiber web 12 laminated with the spunbond nonwoven fabrics had a total weight of 330 g/m² and a thickness of 35 mm.

Example 3

A melt-blown fiber web was produced in the same manner as described in Example 1, except that melt-blown microfibers and non-circular cross-sectional hollow conjugated staple fibers were used at a weight ratio of 20:80 and that the melt-blown fiber web 12 laminated with the spunbond nonwoven fabrics had a total weight of 120 g/m² and a thickness of 12 mm.

Example 4

A melt-blown fiber web was produced in the same manner as described in Example 1, except that melt-blown microfibers and non-circular cross-sectional hollow conjugated staple fibers were used at a weight ratio of 20:80 and that the melt-blown fiber web 12 laminated with the spunbond nonwoven fabrics had a total weight of 190 g/m² and a thickness of 18 mm.

Comparative Example 1

A thermoplastic resin composition comprising 99.8 wt % of homopropylene H7914 polymer resin (LG Chemical Ltd.) having a melt index of 1400 g/10 min (230° C.), 0.01 wt % of UV stabilizer Tinuvin 622 (Ciba Special Chemical) and 0.01 wt % of thermal stabilizer Irganox 1010 was fed into an extruder. The single extruder having an L/D ratio of 1/28 was rotated at 80 rpm to knead, heat and extrude the thermoplastic resin composition. Then, the kneaded composition was transferred to the spinning die 3, and spun in the direction of the collector 13 through 32 orifices (orifice diameter: 0.2 mm) per inch to form spun fibers. During spinning, a high-temperature and high-velocity gas, injected from a high-temperature and high-velocity gas injection holes 4A and 4B formed in the spinning die 3, was allowed to collide with the fibers, thereby producing melt-blown microfibers 6 made of polypropylene and having an average thickness of 3 μm. The spun melt-blown microfibers directly reached the collector and were stacked thereon. The stacked fiber web was wound in a winding machine, and then spunbond nonwoven fabrics having a weight of 15 g/m³ were laminated on both surfaces of the wound fiber web, thereby producing a polypropylene melt-blown fiber web comprising 100 wt % of polypropylene melt-blown microfibers and having a total weight of 330 g/m² and a thickness of 20 mm.

Comparative Example 2

A thermoplastic resin composition comprising 99.8 wt % of homopropylene H7914 polymer resin (LG Chemical Ltd.) having a melt index of 1400 g/10 min (230° C.), 0.01 wt % of UV stabilizer Tinuvin 622 (Ciba Special Chemical) and 0.01 wt % of thermal stabilizer Irganox 1010 was fed into an extruder. The single extruder having an L/D ratio of 1/28 was rotated at 80 rpm to knead, heat and extrude the thermoplastic resin composition. The kneaded composition was transferred to the spinning die 3, and spun in the direction of the collector 13 through 32 orifices (orifice diameter: 0.2 mm) per inch to form spun fibers. During spinning, a high-temperature and high-velocity gas, injected from a high-temperature and high-velocity gas injection holes 4A and 4B formed in the spinning die 3, was allowed to collide with the fibers, thereby producing melt-blown microfibers 6 made of polypropylene and having an average thickness of 3 μm.

At the same time, polyethylene terephthalate staple fibers were supplied through the conjugated fiber supply unit 10 to the portion to which the melt-blown microfibers were spun and in which the melt-blown microfibers 6 were air-blended with the non-circular cross-sectional hollow conjugated staple fibers 5.

The melt-blown fiber web 12 produced as described above had a weight of 300 g/m², and was wound in a winding machine 14 to have a width of 1,800 mm and a length of 50 m. Spunbond nonwoven fabrics were laminated on both surfaces of the wound fiber web, thereby producing a melt-blown fiber web having a total weight of 330 g/m² and a thickness of 35 mm.

Comparative Example 3

A fiber web was produced in the same manner as described in Comparative Example 2, except that polypropylene melt-blown microfibers and general hollow staple fibers made of polyethylene terephthalate (PET) were used at a weight ratio of 75:25. The produced fiber web had a total weight of 190 g/m² and a thickness of 8 mm.

Comparative Example 4

A fiber web was produced in the same manner as described in Comparative Example 2, except that polypropylene melt-blown microfibers and general hollow staple fibers made of polyethylene terephthalate (PET) were used at a weight ratio of 60:40. The produced fiber web had a total weight of 190 g/m² and a thickness of 10 mm.

Test Example

Figure 6:
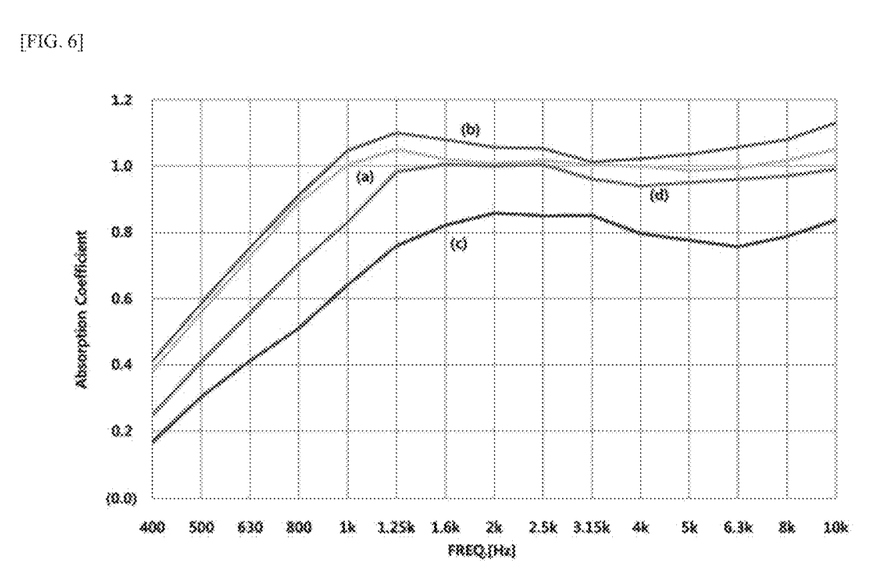
FIG. 6 shows the results of measuring the sound absorption coefficient of a melt-blown fiber web according to an embodiment of the present invention.

The thickness, compression recovery rate, cohesive strength, sound absorption coefficient and thermal resistance value of each of the fiber webs produced in the Examples and the Comparative Examples were measured, and the results of the measurement are shown in Tables 1 to 5 below. FIG. 6 shows the results of measuring the sound absorption coefficients of the fiber webs of Example 1 (a), Example 2 (b), Comparative Example 1 (c) and Comparative Example 2 (d).

The thicknesses of test samples were measured in accordance with Article 5.3 of International Standard ISO 9073-2. The thickness of each test sample was measured, and the average value thereof was recorded as a representative value.

In order to measure the compression recovery rate of test samples, five square test samples, each having a size of 100 mm×100 mm, were collected from any positions. Each of the collected samples was pressed with a pressure of 0.1 kPa using 150 g of a square pressing plate having a size of 120 mm×120 mm, and then the thickness of each sample before compressing was measured with a ruler. To compress each test sample, each sample was placed under a steel plate having dimensions of 100 mm×100 mm×0.8 mm, and a 40 pi weight was placed thereon and allowed to stand at 120±2° C. for 1 hour, after which the thickness of each sample after compression was measured. The difference between the thickness before compression and the thickness after compression was calculated, and then the average value was recorded as a representative value.

The cohesive strength of test samples was measured in accordance with GMW 14695. Specifically, both surfaces of each fiber web were pulled at a speed of 25 mm per minute, and the maximum load at which the cohesion of each fiber web was broken was measured.

To measure the sound absorption performance of test samples, the sound absorption coefficients of test samples, each having a size of 1,000×1,200 mm, were measured by the small scale reverberation chamber method in accordance with technical standard GM 14177.

The thermal resistance values (clo) of test samples were measured in accordance with KS K 0466.

The results of the tests are shown in Tables 1 to 5 below.

TABLE 1

Thickness

| Test sample | Thickness (mm) | Test sample | Thickness (mm) |
|---|---|---|---|
| Example 1 | 35 | Comparative Example 1 | 20 |
| Example 2 | 35 | Comparative Example 2 | 35 |
| Example 3 | 12 | Comparative Example 3 | 8 |
| Example 4 | 18 | Comparative Example 4 | 10 |

TABLE 2

Compression recovery rate (thermal resistance: compressed at 120 ± 2° C. for 1 hour)

| Test sample | Compression recovery rate (%) | Test sample | Compression recovery rate (%) |
|---|---|---|---|
| Example 1 | 65 | Comparative Example 1 | 40 |
| Example 2 | 70 | Comparative Example 2 | 55 |
| Example 3 | 80 | Comparative Example 3 | 50 |
| Example 4 | 80 | Comparative Example 4 | 60 |

TABLE 3

Cohesive strength

| Test sample | Cohesive strength (N/cm$^2$) | Test sample | Cohesive strength (N/cm$^2$) |
|---|---|---|---|
| Example 1 | 51 | Comparative Example 1 | 40 |
| Example 2 | 53 | Comparative Example 2 | 46 |
| Example 3 | 54 | Comparative Example 3 | 43 |
| Example 4 | 56 | Comparative Example 4 | 45 |

TABLE 4

Sound absorption coefficient

| | 400 | 500 | 630 | 800 | 1k | 1.25k | 1.6k | 2k | 2.5k | 3.15k | 4k | 5k | 6.3k | 8k | 10k | NRC |
|---|---|---|---|---|---|---|---|---|---|---|---|---|---|---|---|---|
| Example 1 | 0.38 | 0.56 | 0.73 | 0.89 | 1.00 | 1.05 | 1.02 | 1.01 | 1.02 | 1.00 | 1.00 | 0.99 | 0.99 | 1.02 | 1.05 | 0.89 |
| Example 2 | 0.41 | 0.59 | 0.75 | 0.91 | 1.05 | 1.10 | 1.08 | 1.06 | 1.05 | 1.01 | 1.02 | 1.04 | 1.06 | 1.08 | 1.13 | 0.93 |
| Comp. Example 1 | 0.17 | 0.30 | 0.41 | 0.51 | 0.64 | 0.76 | 0.82 | 0.86 | 0.85 | 0.85 | 0.80 | 0.78 | 0.76 | 0.79 | 0.84 | 0.65 |
| Comp. Example 2 | 0.25 | 0.41 | 0.56 | 0.71 | 0.83 | 0.98 | 1.01 | 1.00 | 1.00 | 0.96 | 0.94 | 0.95 | 0.96 | 0.97 | 0.99 | 0.79 |

TABLE 5

Thermal resistance value

| Test sample | Thermal resistance (clo) | Test sample | Thermal resistance (clo) |
|---|---|---|---|
| Example 3 | 2.507 | Comparative Example 1 | 1.921 |
| Example 4 | 4.207 | Comparative Example 2 | 2.310 |

As can be seen from the test results in the Tables, the fiber web produced in Example 1 of the present invention showed an increase in sound absorption coefficient of about 27%, an increase in compression recovery rate of about 25%, and an increase in cohesive strength of about 22%, compared to the fiber web of Comparative Example 1.

In addition, the fiber web of Example 1 showed an increase in sound absorption coefficient of about 12%, an increase in compression recovery rate of about 10%, and an increase in cohesive strength of about 10%, compared to the fiber web of Comparative Example 2.

The fiber web of Example 2 showed an increase in sound absorption coefficient of about 4%, an increase in compression recovery rate of about 5%, and an increase in cohesive strength of about 4%, compared to the fiber web of Example 1.

The fiber web of Example 3 showed an increase in thermal resistance value of about 30% compared to the fiber web of Comparative Example 3, and the fiber web of Example 4 showed an increase in thermal resistance value of about 82% compared to the fiber web of Comparative Example 4.

Taking the test results together, it can be seen that the melt-blown fiber web of the present invention, which is produced by air-blending melt-blown microfibers with non-circular cross-sectional hollow conjugated staple fibers and has a fiber web framework formed by stacking the horizontal fiber layer and the horizontal fiber layer, has excellent sound absorption performance and high thermal resistance values, because it has an enlarged specific surface area and includes a significantly large number of air layers. Due to the fiber web framework, the elasticity, recovery rate and cohesive strength of the fiber web are improved without reducing the fundamental properties of the fiber web, and thus the fiber web can be used as a sound absorption material or a thermal insulation material.

Furthermore, the melt-blown fiber web has a high compression recovery rate and a reduced weight, compared to conventional sound absorption materials (PU foam, PET felt, glass fiber, etc.), and also has excellent sound absorption performance. In addition, the melt-blown fiber web according to the present invention has improved cohesive strength, high shrinkage rate and deformation rate and excellent processability, compared to conventional melt-blown fiber webs.

DESCRIPTION OF REFERENCE NUMERALS USED IN DRAWINGS

3: spinning die; 3A; inside of orifice;
4A and 4B: high-temperature and high-velocity gas injection holes; 5 and 100: staple fibers;
6 and 102: melt-blown microfibers;
100A: outer portion of staple fibers;
100B: inner portion (hollow portion) of staple fibers;
10: fiber supply unit;
11: melt-blown fibers; 12: fiber web; 13: collector;
14: winding machine;
15: stack pattern change unit;
101A and 101AA: spunbond nonwoven fabric.

The invention claimed is:

1. A method for producing a melt-blown fiber web for a sound absorption material, the method comprising extruding a thermoplastic resin composition through an extruder;

spinning the extruded thermoplastic resin composition together with a high-temperature and high-pressure gas to form thermoplastic resin microfibers;

air-blending the thermoplastic resin microfibers with non-circular cross-sectional hollow conjugated staple fibers to form filaments;

producing a melt-blown fiber web by forming one portion of the filaments into a horizontal fiber layer and consecutively forming a vertical fiber layer on the horizontal fiber layer by bringing the other portion of the filaments into contact with a stack pattern change unit; and winding the produced melt-blown fiber web, wherein the melt-blown fiber web comprising 10 to 50 wt % of thermoplastic resin microfibers and 50 to 90 wt % of non-circular cross-sectional hollow conjugated staple fibers with respect to the total weight of the melt-blown fiber web, and the non-circular cross-sectional hollow conjugated staple fibers are polygonal or tubular in cross section or have a protrusion/depression pattern at an outer circumferential portion thereof, have an enlarged specific surface area, have a single fiber fineness of 1-50 denier, and a hollow ratio of 10% or higher, and 70% to 90% of the microfibers have a diameter of 10 μm or less and 10% to 30% of the microfibers have a diameter of 3 μm or less.

2. The method of claim 1, wherein the vertical fiber layer is consisted of peaks and valleys, which have a height of 2 to 50 mm and are arranged at irregular intervals.

3. The method of claim 1, wherein fibers at a top of the vertical fiber layer are entangled with one another to form an uppermost portion of a waved fiber web.

* * * * *